United States Patent [19]

Brauer

[11] 3,817,203
[45] June 18, 1974

[54] VEHICLE POSITION INDICATOR
[76] Inventor: William Alvin Brauer, 28 W 384 Gary's Mill Rd., Winfield, Ill. 60190
[22] Filed: Sept. 29, 1972
[21] Appl. No.: 293,416

[52] U.S. Cl. ............................................. 116/28 R
[51] Int. Cl. ............................................. B60q
[58] Field of Search ............ 116/28 R, 122, 94, 100; 160/10, 201, 189, 193; 340/61; 33/393; 40/128

[56] References Cited
UNITED STATES PATENTS

| | | | |
|---|---|---|---|
| 2,166,520 | 7/1939 | Challoner | 116/28 R X |
| 2,854,942 | 10/1958 | Ross | 116/28 R |
| 3,011,263 | 12/1961 | Unger | 33/393 |
| 3,165,143 | 1/1965 | Jackwig | 160/189 |
| 3,439,728 | 4/1969 | Martini | 160/193 |

Primary Examiner—Louis J. Capozi
Attorney, Agent, or Firm—Peter Visserman

[57] ABSTRACT

A movable vehicle parking position indicator is disclosed which moves in conjunction with a garage door used to close off the parking area. As the garage door is opened, a ball-like indicator is lowered into a position clearly visible from the driver position of a vehicle entering or properly parked in the garage. As the door is closed, the indicator is retracted.

6 Claims, 3 Drawing Figures

PATENTED JUN 18 1974    3,817,203

VEHICLE POSITION INDICATOR

BACKGROUND OF THE INVENTION

1. Field of the Invention

This invention relates to indicating means used to indicate proper position of a vehicle in a garage, and more specifically relates to movable indicating means which moves in conjunction with a garage door.

2. Prior Art

Prior art arrangements are known in which a ball-like warning device is suspended from a fixed point in a garage above the space to be occupied by a vehicle. In accordance with the prior art, proper positioning of a vehicle in the parking space is attained when the suspended device is aligned with, or touches, a certain portion of the vehicle. A disadvantage of the prior art arrangement is that the suspended device interferes with the use of the parking space when the space is not occupied by a vehicle.

SUMMARY OF THE INVENTION

In accordance with my invention, a movable indicator means is provided which moves in conjunction with a garage door or gate or the like, which is used to close off the parking area. A ball-like indicator device or the like is connected to a retraction device which is responsive to the opening movement of the door to position the indicator device within normal viewing range in front of the driver position of a vehicle entering or parked in the parking space. The retraction device is further responsive to the closing movement of the door to withdraw the indicator device to a position where it does not interfere with other uses of the parking space. Additionally, the movable indicator serves to indicate the position of the garage door to a driver positioned in a vehicle parked in the parking space. This latter feature is particularly important when the garage door is electrically operable by remote control by the driver. In such an instance the indicator device, which moves in conjunction with the door, will indicate to the driver when he can safely back the vehicle through the door opening.

In one illustrative embodiment of this invention an indicator device is suspended over a parking space by means of a flexible cord which is partially wound on a rotatable drum. Another flexible cord is fastened to the top portion of an overhead opening garage door and is also partially wound on the rotatable drum. As the door is opened, the weight of the indicator device causes the drum to rotate in such a direction as to lower the indicator device into the normal range of view in front of the driver position of a vehicle entering or parked in the garage. When subsequently the door is closed, the drum will be rotated in the opposite direction by reason of the cord fastened to the door, and the indicator device will be raised to a relatively higher position.

In a second illustrative embodiment of this invention, an indicator device is suspended over a parking space by means of a flexible cord, and is retracted by means of a springloaded sliding device. A guide rail is mounted in proximity of an overhead garage door and a slide is mounted in sliding contact with the guide rail. A coil spring is fastened to one end of the slide and one end of the rail, and the flexible cord is guided over a pulley and is fastened to the other end of the slide. As the overhead door is opened contact is made between the door and the slide, causing the slide to move in the direction of the pulley and causing the indicator device to be lowered. As the door is closed the slide is drawn back to its original position by the force of the coil spring, causing the indicator device to be raised.

DETAILED DESCRIPTION

Figure 1:
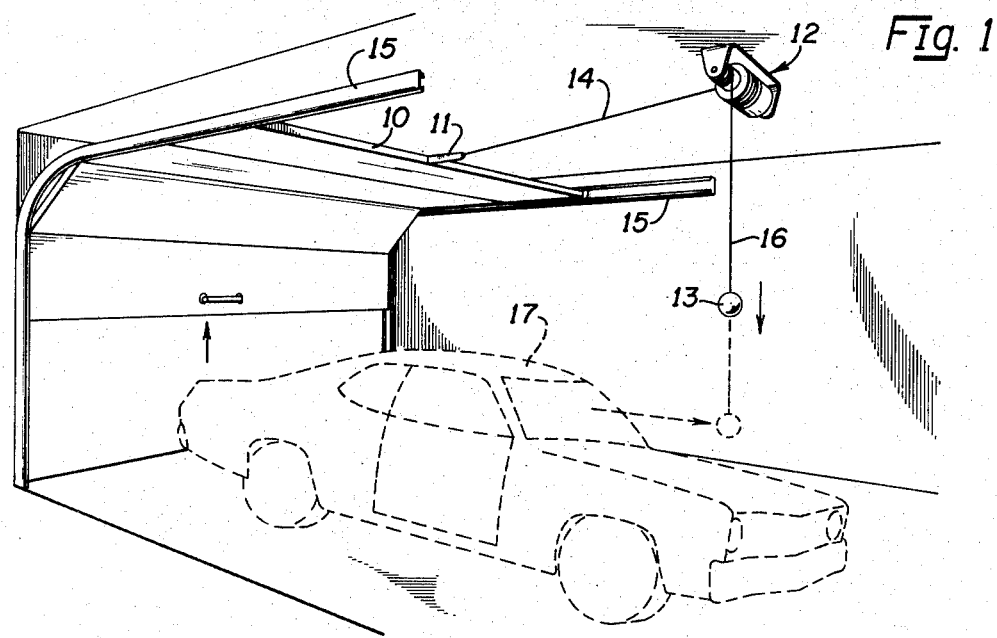
FIG. 1 is a perspective view of a retractable position indicator with a rotatable drum retraction device which operates in conjunction with an overhead garage door.
Figure 2:
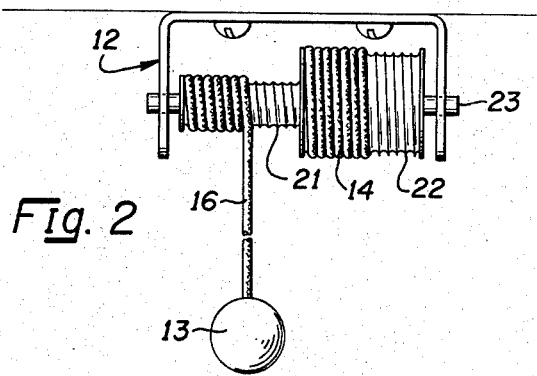
FIG. 2 is a front view of the rotatable drum retraction device.

FIG. 1 is a perspective view of an overhead door 10 commonly used in garages. As can be seen from the drawing, the door has rollers on each side which run in channel like guide rails 15 on either side of the door. The door is opened by lifting and the rollers on either side of the door cause the door to follow the general path of the guide rails. In this illustrative arrangement, a rotatable drum retraction device 12 is mounted above the space in which a vehicle may be parked in the garage, and in proximity of the garage door. A flexible cord 14 extends from the bracket 11, which is mounted on the garage door, to the retraction device 12. Another flexible cord 16 extends from the retraction device downward and is fastened to a ball-like indicator 13. FIG. 2 is a front view of the retraction device. As can be seen from the drawing, in this illustrative emodiment the retraction device 12 comprises two rotatable drums 21 and 22, having different diameters. The two drums are rigidly interconnected such that the forces applied to one of the drums is transmitted to the other. The drums are mounted on a common shaft 23. The flexible cord 14, which is connected to the door 10, is partially wound on the smaller drum 21. In order to attain a more even distribution of the cords on the drums as the drums are rotated, the drums may be grooved so as to guide the cords as shown in FIG. 2. When the door is in the fully closed position, the flexible cord 14 will be extended substantially entirely and the portion of flexible cord 16 extending below the drum 21 will be relatively short. As a result, the indicator ball 13 will be drawn up close to the drum 21. As the door is opened, the cord 14 will tend to become slack and the rotational force exerted on drum 21 by the weight of the indicator ball 13 will cause both drum 21 and drum 22 to turn in a direction so as to lower the indicator and to wind up the cord 14. When the door is fully opened, the indicator ball 13 will be within the normal range of view in front of the driver position of a vehicle 17 entering or parked in the garage. Clearly, the desired lengths of cords 14 and 16 depend on the distance from the door 10 to the retraction device and the distance from the retraction device 12 to the vehicle expected to be parked in the garage. Similarly, the ratio of the diameters of the two drums is a function of the same distances. In one environment, where the distance of travel of the door is approximately twice as great as the distance of travel of the indicator, the diameter of the drum 22 may advantageously be chosen to be twice as great as the diameter of drum 21.

Figure 3:
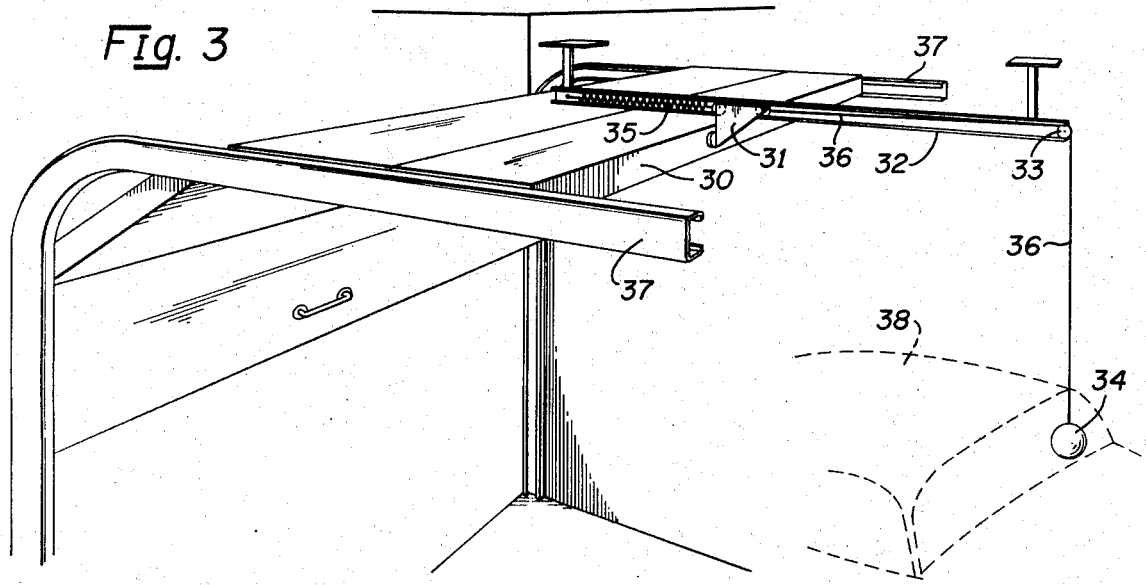
FIG. 3 is a perspective view of a retractable position indicator with a slide retraction device which operates in conjunction with an overhead garage door.

In a second illustrative embodiment of my invention, shown in FIG. 3, a slide retraction device is used with an overhead garage door. As shown, the retraction device comprises a door contact slide 31 having a pair of rollers attached thereto which can travel longitudinally along the guide rail 32. Such guide rail and roller combinations are well known. The retraction device is mounted in the proximity of the door and in such a position that the lower portion of the slide 31 extends into the path of travel of the door 30, which path is determined by the door guides 37. A means is provided, which in this embodiment comprises a coil spring 35, for returning the slide 31 to a position near the garage door 30, when the door is in the closed position. A flexible cord 36 is fastened to the slide 31 and to a ball-like indicator device 34. The flexible cord 36 is guided over a pulley 33 which may be mounted on the guide rail 32 as shown or at some point beyond the end thereof, depending on the desired position of the ball 34 relative to position of a vehicle 38 parked in the garage. As the garage door 30 is opened beyond a certain point, its upper edge will be pushed against the slide 31 tending to move the slide toward the end of the guide rail 32 which is farthest away from the door 30. As a result, the indicator ball 34 will be lowered to a position within the normal range of view in front of the driver position of a vehicle entering or parked in the garage. As the door 30 is closed, the force exerted by the coil spring 35 will tend to move the slide 31 in the direction of travel of the door, thereby causing the indicator ball 34 to be raised. As is apparent, the exact position of the ball 31 when the door is in the fully opened or fully closed position is determined by proper positioning of the guide rail 32 and adjusting the length of the cord 36.

In the foregoing two embodiments of my invention are described. It is understood that these embodiments are illustrative and that other similar arrangements may be developed by those skilled in the art without departing from the scope or spirit of my invention.

What is claimed is:

1. In combination with a garage structure having an entry way at one end thereof, a garage door having a closed position for closing off said entry way and an open position allowing access to said garage, a parking area enclosed by said garage structure and adjacent said door having defined boundaries, said structure being extended over said parking area;
   a rotatable drum supported by said structure over said area;
   flexible cord means partially wound around said drum and connected to said door at one end thereof;
   indicator means connected to another end of said cord means and suspended over said parking area below said drum;
   said drum being rotated in a first direction to lower said indicator means when said door is moved to said open position and rotated in a direction opposite said first direction to raise said indicator means when said door is moved to said closed position.

2. An arrangement in accordance with claim 1, wherein said rotatable drum comprises a first portion having a first diameter and a second portion having a second relatively larger diameter, and said flexible cord means comprises a first part connected to said indicator means and partially wound on said first portion and a second part connected to said door and partially wound on said second portion.

3. The combination in accordance with claim 9, wherein said cord means comprises a section of a predetermined length extending beyond said drum adjacent said indicator means to allow said indicator means to be suspended in a position in front of the driver position of a car properly parked within said boundaries when said door is in said open position.

4. An arrangement for simultaneously indicating the proper position of a vehicle in a parking space having defined boundaries within a garage structure and the position of a garage door adjacent said space;
   a doorway in said structure in alignment with said space to allow access to said space, said garage door being slidably connected to said structure and having a first position blocking said doorway and a second position allowing vehicular access through said doorway;
   a rotatable drum having a first section of a first diameter and a second section of a second relatively larger diameter;
   an axis extending through said drum;
   bracket means connected to said structure for supporting said axis and said drum over said space;
   a first flexible cord partially wound on said first section of said drum;
   an indicator ball suspended from said first cord over said space;
   a second flexible cord partially wound on said second section of said drum and connected to said door for rotating said drum in first direction when said door is moved to said closed position;
   said first cord being wound on said drum in a direction to raise said ball when said drum is rotated in said first direction;
   said drum being rotated in a second direction opposite said first direction when said door is moved to said open position, to lower said ball to a position in front of the driver position of a vehicle properly parked in said space.

5. The arrangement in accordance with claim 4, wherein said door is an overhead operating door slidably movable in a pair of tracks connected to said structure, having a vertical closed position at one end of said space and a horizontal open position wherein said door is disposed over said space.

6. The arrangement in accordance with claim 4, wherein said ball is of greater than a predetermined weight, sufficient to rotate said drum in said second direction when said door is moved to said open position.

* * * * *